United States Patent
Salisbury et al.

(10) Patent No.: US 11,863,903 B2
(45) Date of Patent: Jan. 2, 2024

(54) CAMERA WITH FLEXURE FOCUS MECHANISM

(71) Applicant: Thermoteknix Systems Limited, Cambridge (GB)

(72) Inventors: Richard S. Salisbury, Cambridge (GB); Alex Buckingham, Cambridge (GB)

(73) Assignee: Thermoteknix Systems Ltd., Waterbeach (GB)

( * ) Notice: Subject to any disclaimer, the term of this patent is extended or adjusted under 35 U.S.C. 154(b) by 65 days.

(21) Appl. No.: 17/579,908

(22) Filed: Jan. 20, 2022

(65) Prior Publication Data
US 2022/0232174 A1 Jul. 21, 2022

(30) Foreign Application Priority Data
Jan. 21, 2021 (GB) .................................. 2100808

(51) Int. Cl.
*H04N 5/33* (2023.01)
*H04N 23/51* (2023.01)
*H04N 23/67* (2023.01)
(52) U.S. Cl.
CPC ............... *H04N 5/33* (2013.01); *H04N 23/51* (2023.01); *H04N 23/67* (2023.01)
(58) Field of Classification Search
CPC .................................... G02B 7/04; G02B 7/09
See application file for complete search history.

(56) References Cited

U.S. PATENT DOCUMENTS

| 4,156,567 A | * | 5/1979 | Ostrowski | G02B 7/40 396/89 |
| 4,840,457 A | * | 6/1989 | Remer | G11B 7/0932 |
| 6,813,225 B2 | * | 11/2004 | Widdowson | G02B 7/08 369/44.14 |

(Continued)

FOREIGN PATENT DOCUMENTS

| EP | 3837583 A1 | 6/2021 |
| WO | 2014144863 A2 | 11/2014 |

OTHER PUBLICATIONS

Search Report dated Jul. 7, 2021, in connection with GB2100808.1, filed Jan. 21, 2021.

(Continued)

*Primary Examiner* — Leon W Rhodes, Jr.
(74) *Attorney, Agent, or Firm* — Downs Rachlin Martin PLLC

(57) ABSTRACT

A flexure assembly operable to control variation of the displacement between a detector and a lensing arrangement along the optical axis of a camera so as to vary camera focus, and a camera incorporating such a flexure assembly. In some embodiments, the flexure assembly provides for precise control of linear displacement along the optical axis and minimal displacement along other axes or modes. A flexure assembly can additionally be relatively lightweight in construction. In some embodiments, the flexure assembly comprises one or more flexure elements adapted to permit movement along a movement axis and resist movement along axes other than the movement axis. In some embodiments, the movement axis of the or each flexure element is aligned with the optical axis of a corresponding lensing assembly.

25 Claims, 5 Drawing Sheets

(56) References Cited

U.S. PATENT DOCUMENTS

| | | | |
|---|---|---|---|
| 7,348,562 B2 * | 3/2008 | Irani | G01J 5/0265 250/339.02 |
| 2011/0279916 A1 * | 11/2011 | Brown | G02B 7/08 359/823 |
| 2016/0154249 A1 | 6/2016 | Yeo et al. | |
| 2020/0243577 A1 | 7/2020 | Pei et al. | |

OTHER PUBLICATIONS

Search Report dated Nov. 26, 2021, in connection with GB2100808. 1, filed Jan. 21, 2021.

* cited by examiner

CAMERA WITH FLEXURE FOCUS MECHANISM

TECHNICAL FIELD OF THE INVENTION

The present invention relates to focus mechanisms for cameras, especially portable or handheld infrared cameras and to flexures suitable to provide such focus mechanisms.

BACKGROUND TO THE INVENTION

Handheld infrared (IR) cameras typically comprise a lensing assembly and a detector aligned along an optical axis where the lensing assembly is operable to direct incident light on to the detector. A variable focus lens assembly may comprise different lens elements and a mechanism to vary separation between these elements so as to vary the focus. Typically, this mechanism may comprise corresponding coned metal elements with custom multi-start threads. This adds weight to the camera and requires some dexterity to operate. Accordingly, to save weight some IR cameras use a fixed focus lens assembly with a simplified focusing mechanism enabling the displacement of the components of the lensing assembly relative to the detector to be varied, so as to vary the focus of the camera.

On typical portable IR cameras, the focusing mechanism may comprise a linear rail system, threaded interconnection or the like. Such mechanisms are relatively straightforward to implement but are susceptible to unwanted pitch, roll and yaw relative to the optical axis. This limits the precision of focus that can be achieved. Where the focus variation is controlled by manual manipulation of the mechanism, unwanted focus variation can occur when adjusting camera positioning. Whilst this can be alleviated by using motor controlled focusing mechanisms, these can add significant complexity and additional weight. In this context, a weight of 1-2 Kg is not uncommon and thus maintaining alignment of the optical axis with a distant target, say 5 km away, can be difficult. This can even be an issue when the camera is fitted to a tripod.

It is therefore an object of the present invention to provide a focusing mechanism for use in a handheld IR camera that at least partially overcomes or alleviates the above problems.

SUMMARY OF THE INVENTION

According to a first aspect of the present invention there is provided a camera comprising: a detector operable to output a signal indicative of light incident upon the detector; a lensing assembly operable to direct incident light onto the detector, the lensing assembly having an optical axis aligned with the detector; and a flexure assembly operable to control variation of the displacement between the detector and the lensing arrangement along the said optical axis so as to vary camera focus.

The use of a flexure assembly for focusing provides for precise control of linear displacement along the optical axis and minimal displacement along other axes or modes. A flexure assembly can additionally be relatively lightweight in construction.

The flexure assembly may comprise one or more flexure elements adapted to permit movement along a movement axis and resist movement along axes other than the movement axis. Preferably, the movement axis of the or each flexure element is aligned with the optical axis of the lensing assembly. In this context, aligned may encompass substantially parallel optical and movement axes.

The flexure assembly may comprise one or more flexure elements fitted between a fixed portion and a moving portion.

The fixed portion may be fixed to a frame or housing of the camera. The lensing assembly may be mounted to the moving portion and the detector may be mounted to the fixed portion. Alternatively, the detector may be mounted to the moving portion and the lensing assembly may be mounted to the fixed portion. It is beneficial to have the lensing assembly mounted to the fixed portion as this is typically heavier than the detector.

The moving portion may be coupled to an actuator. The actuator may be a linear actuator. The actuator may be operable to move the moving portion relative to the fixed portion. The actuator may be manually powered or may be or electrically powered. Manually powered actuators may incorporate thumbwheels or the like to generate motion of the actuator from manual power. Electrically powered actuators may comprise electric motors, piezo electric elements, electromagnets or the like. The actuator may comprise an encoder such that actuator motion can be monitored. Suitable encoders may be magnetic, optical, electronic, or mechanical as desired or as required. Suitable types of actuators include but are not limited to: a piezoelectric linear stage with magnetic linear encoder, an Encoded DC Geared motor, a manual lead screw operated via thumbwheel, or the like.

The actuator may be controlled in response to a focus control system. The focus control system may comprise a control unit operable to drive the actuator in response to control signals. The actuator may be operable to drive the moving portion to one or more pre-set positions. This can enable particular pre-set focus settings to be readily selected and implemented.

The control signals may be output in response to user input. The user input may be received via a user interface or one or more user input means. The user input means may comprise rotary switches, scroll wheels, push switches, toggle switches, touch sensitive switches or the like. Additionally, or alternatively, the control signals may be generated by a camera control unit or relayed by a camera control unit in response to signals received from a remote device. This could allow operation of a camera in an outdoor or inhospitable environment to be controlled by a user in an indoor or sheltered environment.

The moving portion may be biased in a particular direction or toward a particular position. The biasing may be implemented by the provision of one or more biasing elements. In one embodiment, the or each biasing element may be a spring.

The fixed portion and moving portion may each comprise substantially flat structures. The flat structures may predominantly extend in planes substantially parallel to the movement axis. In one embodiment, the fixed and/or moving portions may each comprise a block with one or more slots. In another embodiment, the fixed and/or moving portions may each comprise a frame formed from one or more elongate rods.

Suitable flexure elements include but are not limited to flat shims, rods or shaped blocks as desired or as appropriate. Where the flexure assembly comprises two or more flexure elements, each flexure elements may be of the same type.

Where the flexure element comprises a flat shim, the shim may be etched, eroded or otherwise shaped from a sheet of material. In one example, the shim may be photo-etched. The shim may comprise a central aperture. This can permit passage of light and/or relative movement between the lensing assembly and detector past the shim. The shim may be provided with a stiffening element. The stiffening element may comprise a relatively rigid sheet bonded to said flat shim. In some such cases, the stiffening element may be formed from a thicker sheet of material than the shim. Bonding may be achieved by suitable adhesive, welding or fasteners such as rivets, screws, bolts and the like as required or desired. Shims may be formed of any suitable material, typically a metal and in one example, steel or stainless steel.

Where the flexure element comprises a rod, the rod may comprise one or more sections of different diameter or stiffness. Sections of different diameter or stiffness may be formed by bonding different rod sections together. Bonding may be achieved by suitable adhesive or welding as required or desired. Such rods may be formed of a single material or may comprise sections formed of different materials as appropriate. Rods may be formed of any suitable material, typically a metal and in one example, steel or stainless steel.

Where the flexure element comprises a shaped monothetic block, the block may be shaped by a suitable erosion process from a simple basic form. Typically, the erosion process may be wire or spark erosion. The monolithic element may be formed of any suitable material, typically a metal and in one example, steel or stainless steel.

In a preferred embodiment, the flexure assembly may comprise two flat shims, each flat shim fitted between corresponding ends of the fixed portion and the moving portion; and wherein each flat shim is provided with an aperture aligned with a common movement axis of the flat shims. The detector may be provided between the flat shims and aligned with the optical axis. The lensing assembly may be provided at one end of the flexure assembly. In such an assembly, the actuator may be provided on an opposing side of the moving portion to the flat shims.

The detector may be operable to detect light in any suitable wavelength range. Suitable wavelength ranges my include infrared (IR), visible or ultraviolet (UV) wavelength ranges. In a preferred embodiment, the detector is operable to detect light in the IR wavelength range.

The detector may comprise an array of detecting elements. The lensing assembly may comprise a single lens or multiple lenses, as required or as desired.

The detector may be mounted on a substrate. the substrate may be substantially planar. In such embodiments, the substrate may extend in a plane substantially perpendicular to the optical axis. In one embodiment, the substrate may comprise a printed circuit board.

The lensing arrangement can comprise one or more lenses. In some embodiments, the lensing arrangement may additionally or alternatively comprise one or more mirrors.

The camera may be a handheld camera. In this context, a handheld camera may comprise a camera adapted to be held by a user whilst capturing an image. This would equally apply to a camera suitable for handheld use, where the camera might typically be mounted on a tripod in use.

According to a second aspect of the present invention, there is provided a flexure assembly suitable for controlling variation of displacement between components connected to respective fixed and moving portions, the flexure assembly comprising: two flat shims, each flat shim fitted between corresponding ends of the fixed portion and the moving portion; and wherein each flat shim is provided with an aperture aligned with a common movement axis of the flat shims.

The flexure assembly of the second aspect of the present invention may incorporate any or all features of the camera of the first aspect of the present invention as desired or as required.

An actuator may be provided on an opposing side of the moving portion to the flat shims. The moving portion may be biased in a particular direction or toward a particular position.

In one embodiment, the flexure assembly may be integrated into a camera. In such embodiments, a detector may be fitted to one or the fixed portion or the moving portion and a lensing assembly having an optical axis aligned with the detector may be fitted to the other of the fixed portion or the moving portion. The optical axis may be aligned with the movement axis of the flat shims. The detector may be provided between the flat shims and aligned with the optical axis. The lensing assembly may be provided at one end of the flexure assembly.

BRIEF DESCRIPTION OF THE DRAWINGS

In order that the invention may be more clearly understood one or more embodiments thereof will now be described, by way of example only, with reference to the accompanying drawings, of which.

DETAILED DESCRIPTION OF THE INVENTION

Figure 1:
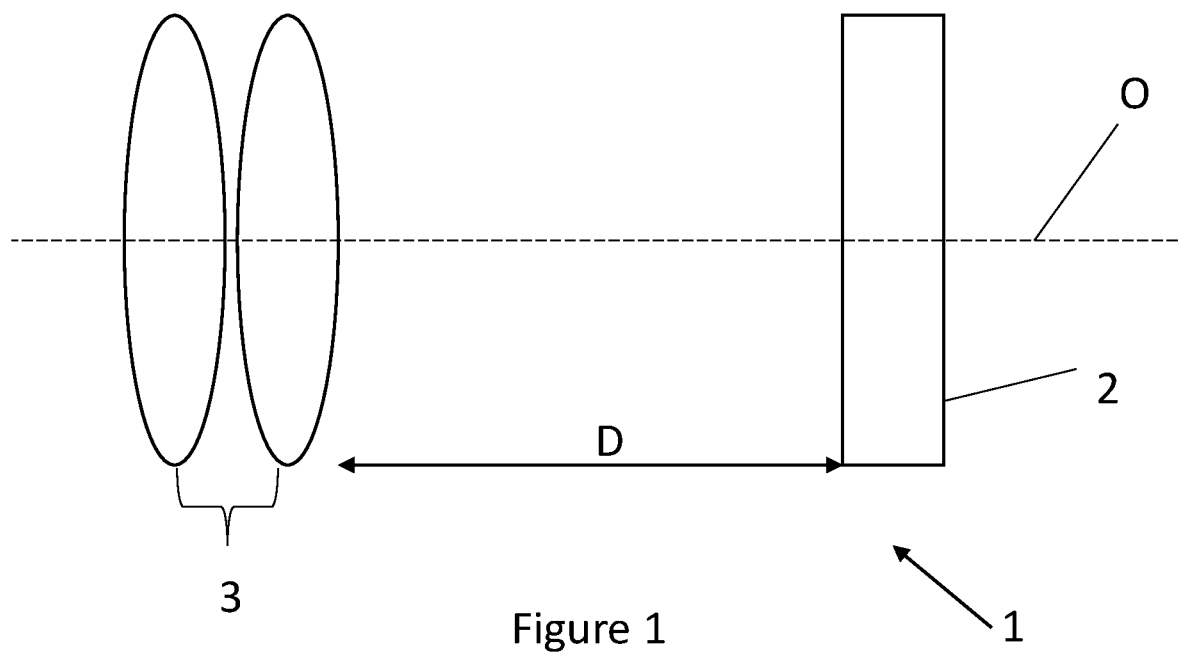
FIG. 1 is a schematic illustration of a camera according to the present invention.

Turing now to FIG. 1, an infrared camera 1 comprises a detector 2 operable to output a signal indicative of light incident upon the detector 2; and a lensing assembly 3 operable to direct incident light onto the detector. The lensing assembly has an optical axis O aligned with the detector 2. In order to focus light from the lensing assembly on the detector, the displacement D between the detector 2 and the lensing assembly 3 can be varied. In the present invention, the displacement D is varied by use of a flexure assembly (not shown in FIG. 1). This provides a relatively lightweight mechanism and precise control of linear displacement along the optical axis with minimal displacement along other axes or modes.

Figure 2:
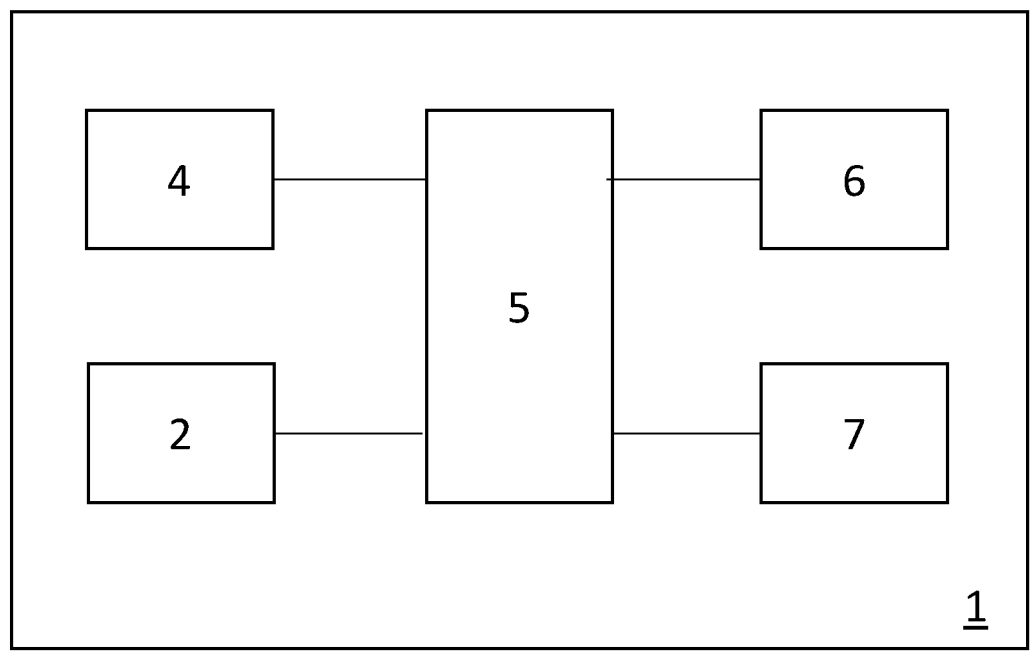
FIG. 2 is a schematic illustration of a control architecture for camera according to the present invention.

The displacement D, can be controlled by a manual displacement mechanism. More typically, as illustrated schematically in FIG. 2, the displacement D is controlled by an actuator 4. As shown in FIG. 2, operation of actuator 4 is in response to a control unit 5. The control unit 5 operation may be automated or be in response to operation of user input means 6 such as buttons, switches dials and the like. In many embodiments, the control unit 5 may also control a display unit 7 providing user feedback on the image captured by detector 2 and/or focusing settings.

Figure 3:
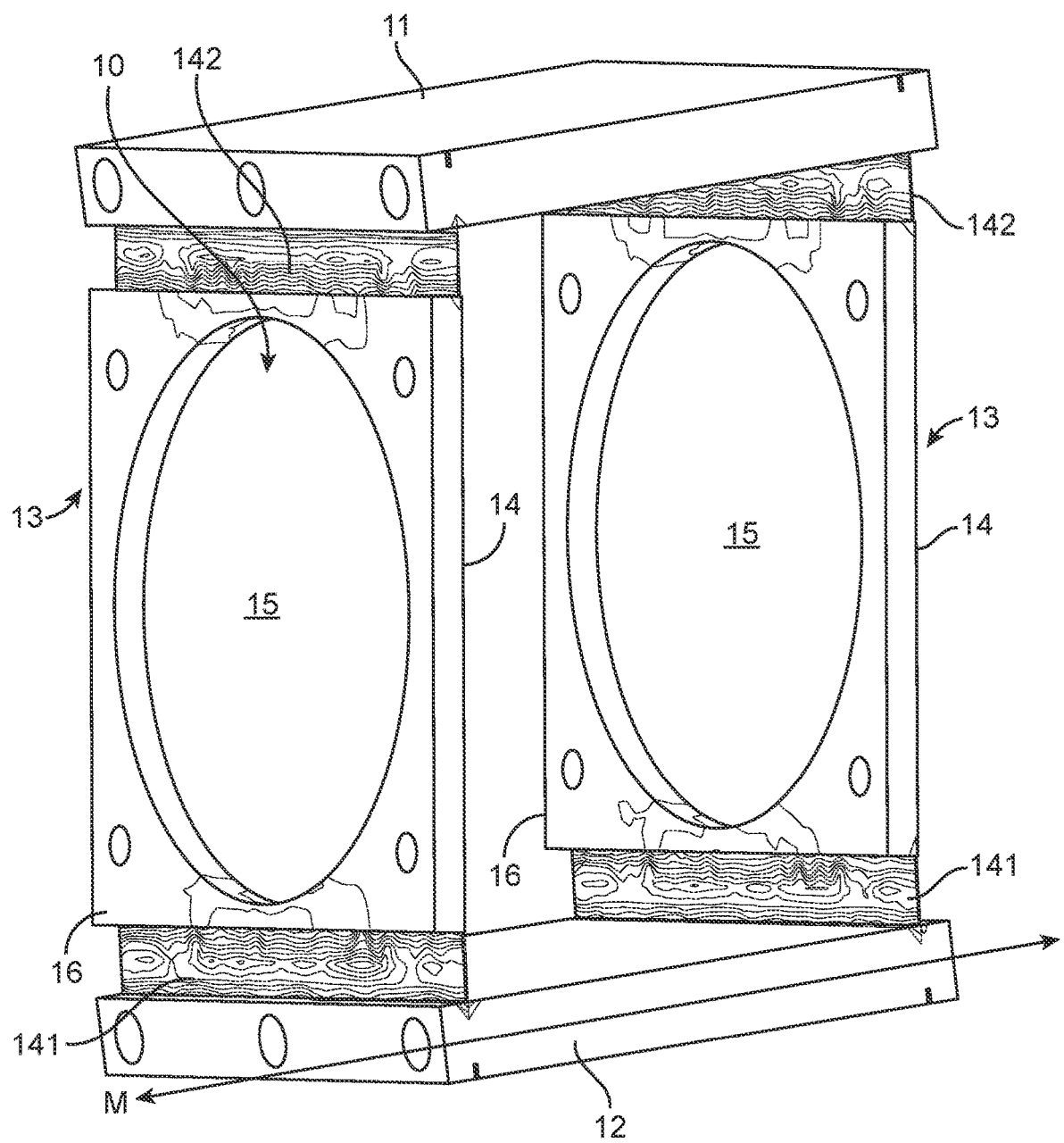
FIG. 3 shows a flexure assembly according to the present invention.
Figure 4:
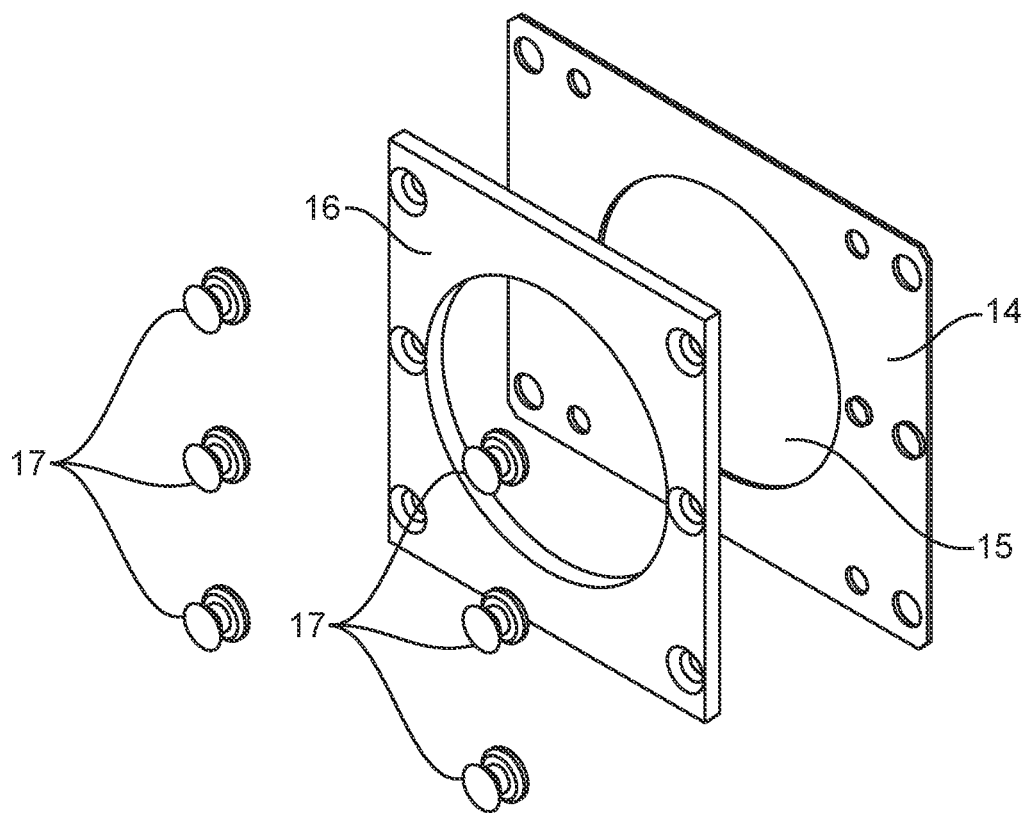
FIG. 4 is an exploded view of a flat shim for a flexure assembly according to the present invention.

Turning now to FIG. 3, a flexure assembly 10 suitable for use in camera 1 comprises a fixed portion 11 and a moving portion 12 operable to move along a movement axis M relative to the fixed portion 11. A pair of flexure elements 13 are fitted between the ends of the fixed and moving portions 11, 12. Each flexure element 13 is in the form of a flat shim having a central aperture 15. Optionally, each shim is provided with a stiffening element 16 in the form of a sheet bonded to the shim 14 by a number of rivets 17. This is illustrated most clearly in FIG. 4.

Figure 5:
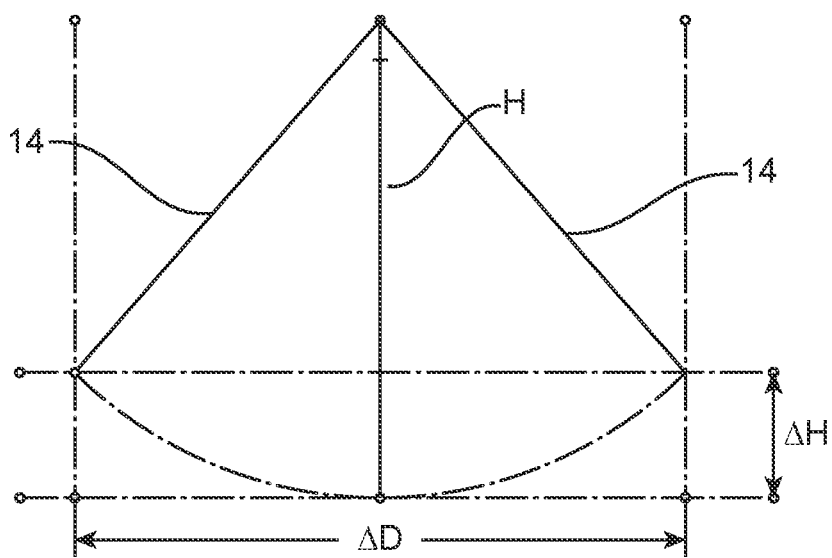
FIG. 5 is a schematic illustration of the range of motion achievable using the flexure of the present invention.

The ends 141, 142 of each shim 14, adjacent to where the shims 14 are fitted to the fixed and moving portions 11, 12 are free to flex to enable movement of the moving portion 12 relative to the fixed portion 11 along movement direction M. This flexure assembly therefore deforms from a square or rectangular configuration defined between the shims 14 and fixed and moving portions 11, 12 to a parallelogram configuration. This movement for a single shim 14 is illustrated in FIG. 5. For a given range of movement $\Delta D$ along the movement direction M, there is a relatively small displacement $\Delta H$, the displacement $\Delta H$ determined by the length H of shim 14 and the permitted range of movement $\Delta D$ in the movement direction M. For example, a shim of length 48.6 mm with a permitted displacement range of movement $\Delta D$ of $=/-0.75$ mm would in experience a $\Delta H$ of 6 μm. This is sufficiently small not to have an undue adverse impact on the operation of a camera 1 where displacement between lensing assembly 3 and detector 2 is controlled by such a flexure arrangement 10.

Figure 6:
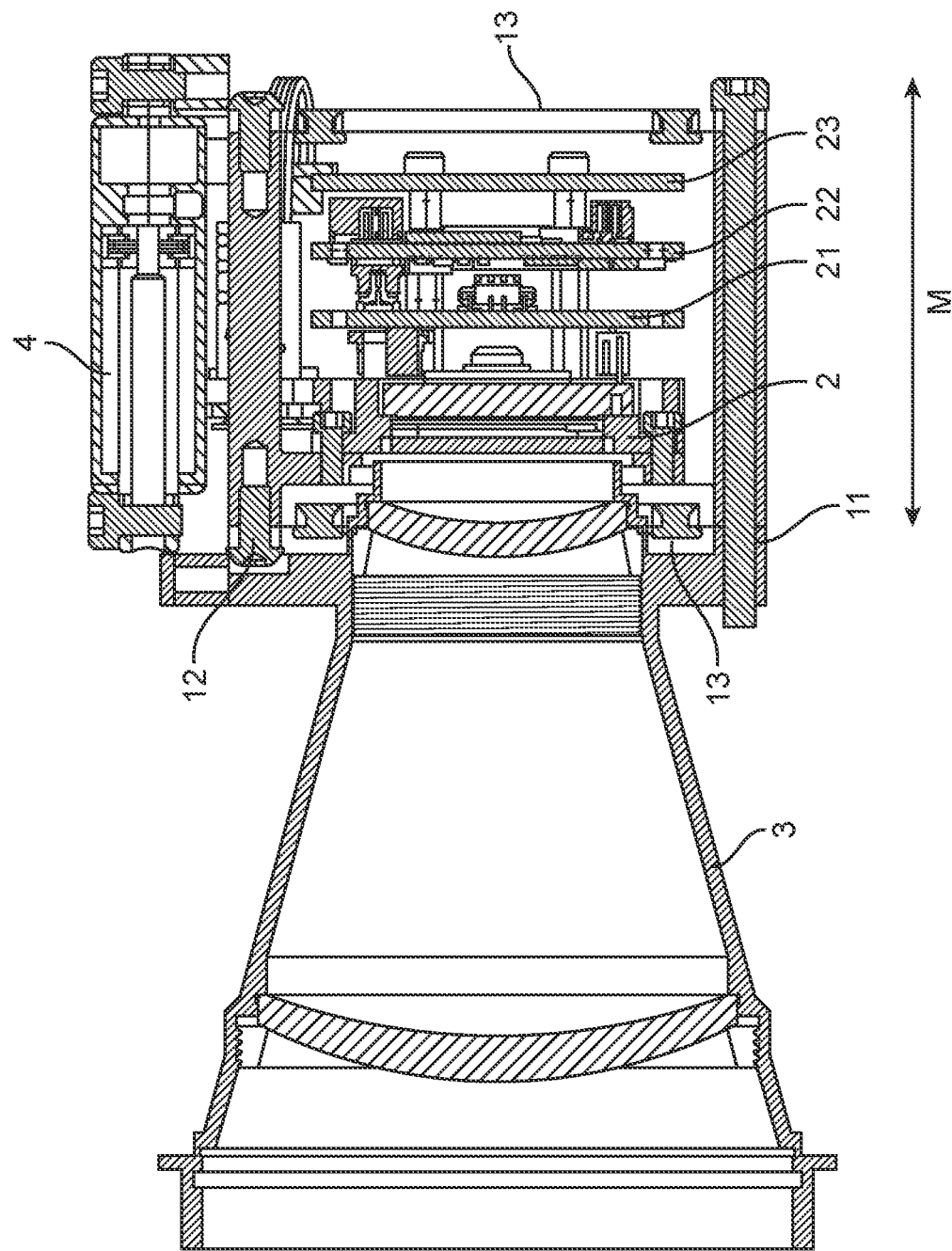
FIG. 6 is a side view of the flexure assembly of FIG. 3 integrated into a camera according to the present invention.
Figure 7:
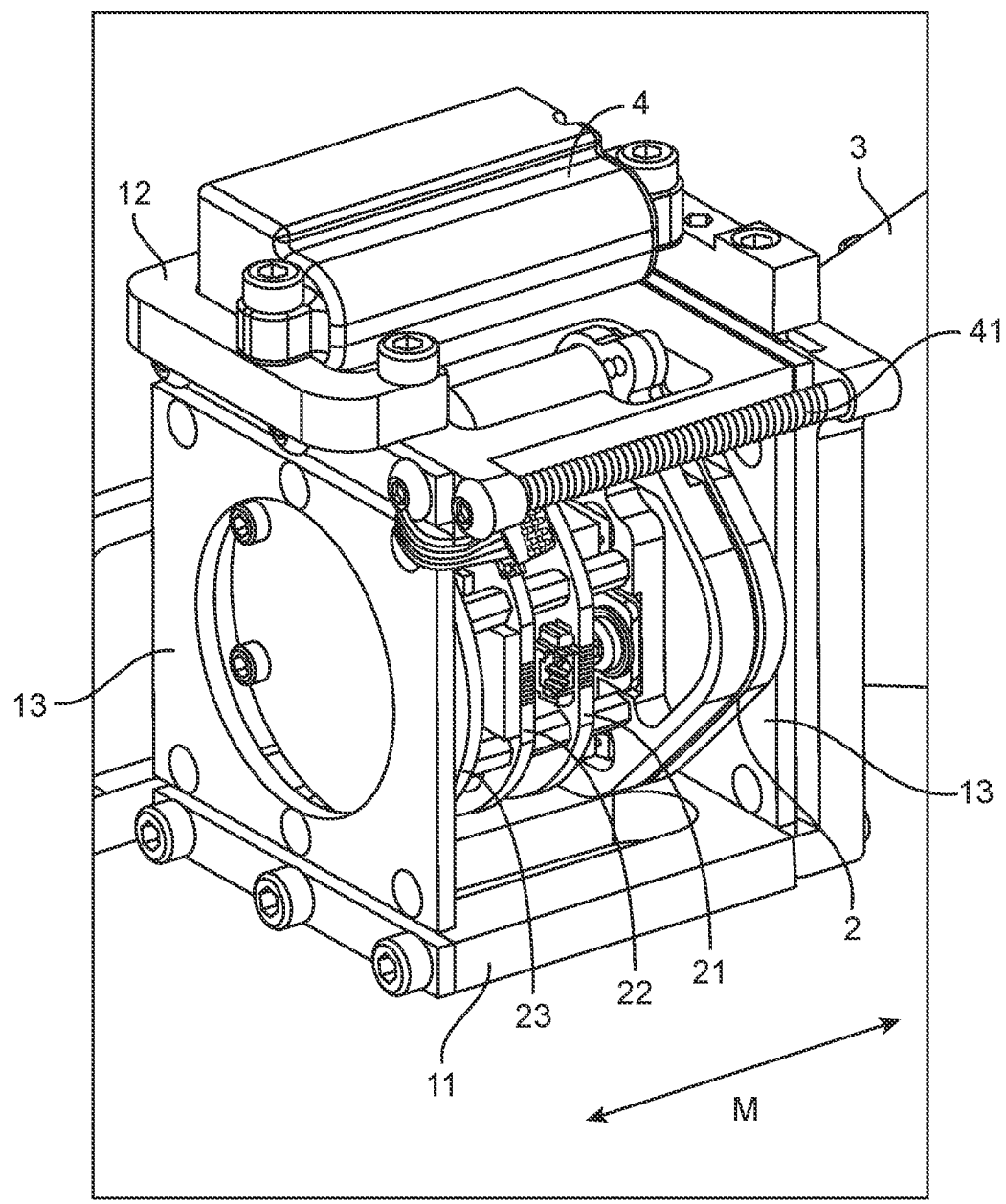
FIG. 7 is a perspective view of the flexure assembly of FIG. 3 integrated into a camera according to the present invention.

Turning to FIGS. 6 and 7, these illustrate a camera 1 incorporating flexure assembly 10. The lensing assembly 3 is mounted to fixed portion 11 of flexure assembly 10. Typically, the lensing assembly 3 and/or fixed portion 11 would additional be mounted to a frame (not shown) or external housing (not shown) of the camera 1.

The detector 2, in the form of an imaging array, is mounted to the moving portion 12 of flexure assembly 10. As shown in the figures, the detector 2 may be provided with additional printed circuit boards 21-23 upon which additional components of the detector and/or control unit 5 may be provided. The detector 2 is aligned with apertures 15 and the optical axis O of the lensing assembly 3.

Linear actuator 4 is coupled to moving portion 12 and is operable to vary the displacement of moving portion 12 along movement axis M, which is aligned with optical axis O. A biasing spring 41 is provided to provide a biasing force acting against actuator 4. This can help restore the moving portion 12 to a desired origin position.

In this manner the flexure assembly 10, powered by the actuator 4 provides a lightweight mechanism that can facilitate ready control of the displacement between lensing assembly 3 and detector 2 and hence focusing of the camera 1. Furthermore, displacement perpendicular to the movement direction M/optical axis O is very low as discussed above.

The one or more embodiments are described above by way of example only. Many variations are possible without departing from the scope of protection afforded by the appended claims.

The invention claimed is:

1. A camera, comprising:
   a detector operable to output a signal indicative of light incident upon the detector;
   a lensing assembly operable to direct incident light onto the detector, the lensing assembly having an optical axis aligned with the detector; and
   a flexure assembly operable to control variation of and the lensing arrangement along the said optical axis so as to vary camera focus, the flexure assembly including:
   a fixed portion;
   a moving portion spaced apart from the fixed portion;
   at least a pair of flexure elements spaced apart from one another and fitted between the first portion and the moving portion, the at least a pair of flexure elements adapted to permit movement of the moving portion relative to the fixed portion along a movement axis and to resist movement of the moving portion relative to the fixed portion along axes other than the movement axis;
   wherein the detector is located between the fixed portion and the moving portion and between the pair of flexure elements.

2. The camera of claim 1, wherein the movement axis of each flexure element is aligned with the optical axis of the lensing assembly.

3. The camera of claim 1, wherein the lensing assembly is mounted to the moving portion and the detector is mounted to the fixed portion.

4. The camera of claim 1, wherein the moving portion is coupled to an actuator operable to move the moving portion relative to the fixed portion.

5. The camera of claim 4, wherein the actuator is controlled in response to a focus control system.

6. The camera of claim 1, wherein the moving portion is biased in a particular direction or toward a particular position by the provision of one or more biasing elements.

7. The camera of claim 1, wherein the flexure elements are rods or shaped blocks.

8. The camera of claim 1, wherein the flexure elements are flat shims.

9. The camera of claim 8, wherein each shim comprises a central aperture.

10. The camera of claim 8, wherein each shim is provided with a stiffening element.

11. The camera of claim 1, wherein the pair of flexure elements comprise two flat shims, each flat shim fitted between corresponding ends of the fixed portion and the moving portion; and wherein each flat shim is provided with an aperture aligned with a common movement axis of the flat shims.

12. The camera of claim 11, wherein the detector is provided between the flat shims and aligned with the optical axis.

13. The camera of claim 11, wherein the lensing assembly is provided at one end of the flexure assembly.

14. The camera of claim 11, wherein the detector is operable to detect light in the infrared (IR) wavelength range.

15. The camera of claim 11, wherein the camera is a handheld camera.

16. The camera of claim 1, wherein the lensing assembly is mounted to the fixed portion and the detector is mounted to the moving portion.

17. A flexure assembly suitable for controlling variation of displacement between components connected to respective fixed and moving portions, the flexure assembly comprising:
   an optical axis having first and second sides opposite one another and located so that the fixed portion is located entirely on the first side and the moving portion is located entirely on the second side; and two flat shims, each flat shim fitted between corresponding ends of the fixed portion and the moving portion;

wherein each flat shim is provided with an aperture aligned with a common movement axis of the flat shims.

18. The flexure assembly of claim 17, wherein an actuator is provided on an opposing side of the moving portion to the flat shims.

19. The flexure assembly of claim 17, wherein the moving portion is biased in a particular direction or toward a particular position by the provision of one or more biasing elements.

20. The flexure assembly of claim 17, wherein each shim comprises a central aperture.

21. The flexure assembly of claim 17, wherein each shim is provided with a stiffening element.

22. The flexure assembly of claim 21, wherein the stiffening element comprises a relatively rigid sheet bonded to said flat shim.

23. The flexure assembly of claim 22, wherein the bonding is achieved by rivets.

24. The flexure assembly of claim 17, wherein the shims are formed or steel or stainless steel.

25. A camera, comprising:

a detector operable to output a signal indicative of light incident upon the detector;

a lensing assembly operable to direct incident light onto the detector, the lensing assembly having an optical axis aligned with the detector; and a flexure assembly operable to control variation of the displacement between the detector and the lensing arrangement along the said optical axis so as to vary camera focus, the flexure assembly including:

a fixed portion located entirely on a first side of the optical axis;

a moving portion spaced apart from the fixed portion and located entirely on a second side of the optical axis, the second side being opposite the first side;

at least one flexure element fitted between the first portion and the moving portion, the at least one flexure element adapted to permit movement of the moving portion relative to the fixed portion along a movement axis and to resist movement of the moving portion relative to the fixed portion along axes other than the movement axis.

\* \* \* \* \*